United States Patent [19]

Vollmer et al.

[11] 4,133,240
[45] Jan. 9, 1979

[54] CUTTING TEETH FOR CIRCULAR SAW BLADES

[75] Inventors: Erwin H. Vollmer, Balmerstrassa, Fed. Rep. of Germany; George J. Vollmer, Sewickley, Pa.

[73] Assignee: Vollmer of America Corporation, Pittsburgh, Pa.

[21] Appl. No.: 830,673

[22] Filed: Sep. 6, 1977

[51] Int. Cl.² .............................................. B27B 33/08
[52] U.S. Cl. ....................................... 83/848; 83/835; 407/33; 407/118
[58] Field of Search .............................. 407/33, 118; 83/835–855

[56] References Cited

U.S. PATENT DOCUMENTS 3,619,880  11/1971  Pahlitzsch .................... 83/835 X
3,878,747  4/1975  Soderstrom ........................ 407/33

Primary Examiner—J. M. Meister
Attorney, Agent, or Firm—Reed, Smith, Shaw & McClay

[57] ABSTRACT

The invention disclosed pertains to improved raker and low teeth for use in circular saw blades. Each raker tooth includes a leading face and a top portion. The leading face comprises a first and second planar surface wherein the second surface extends at a negative angle from the first surface and to the top that consists of five facets in which two pairs of facets lie in planes offset at a first and second angles from the plane of a first center facet. Each low tooth also includes a leading face and top portion. However, the leading face includes a first planar surface and a second portion consisting of five facets each of which extends from the first surface to the top portion at a negative angle of inclination, and two pairs of facets lie in planes offset at first and second angles from a first center facet.

4 Claims, 7 Drawing Figures

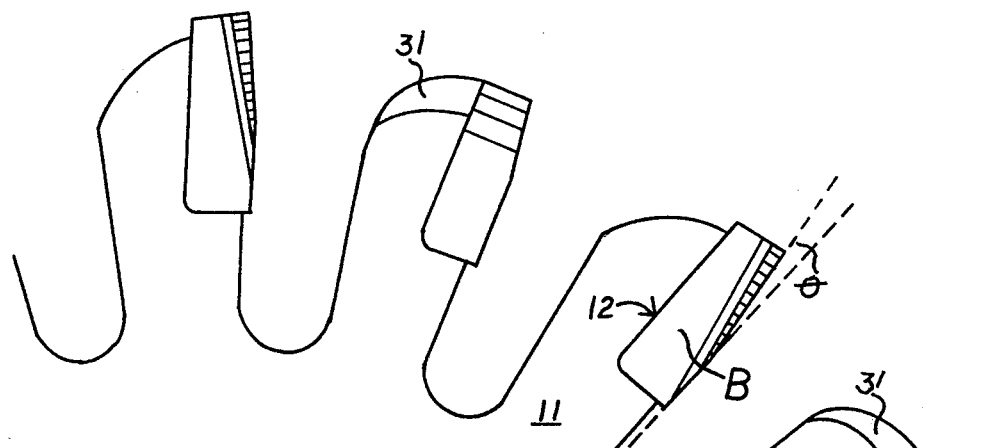
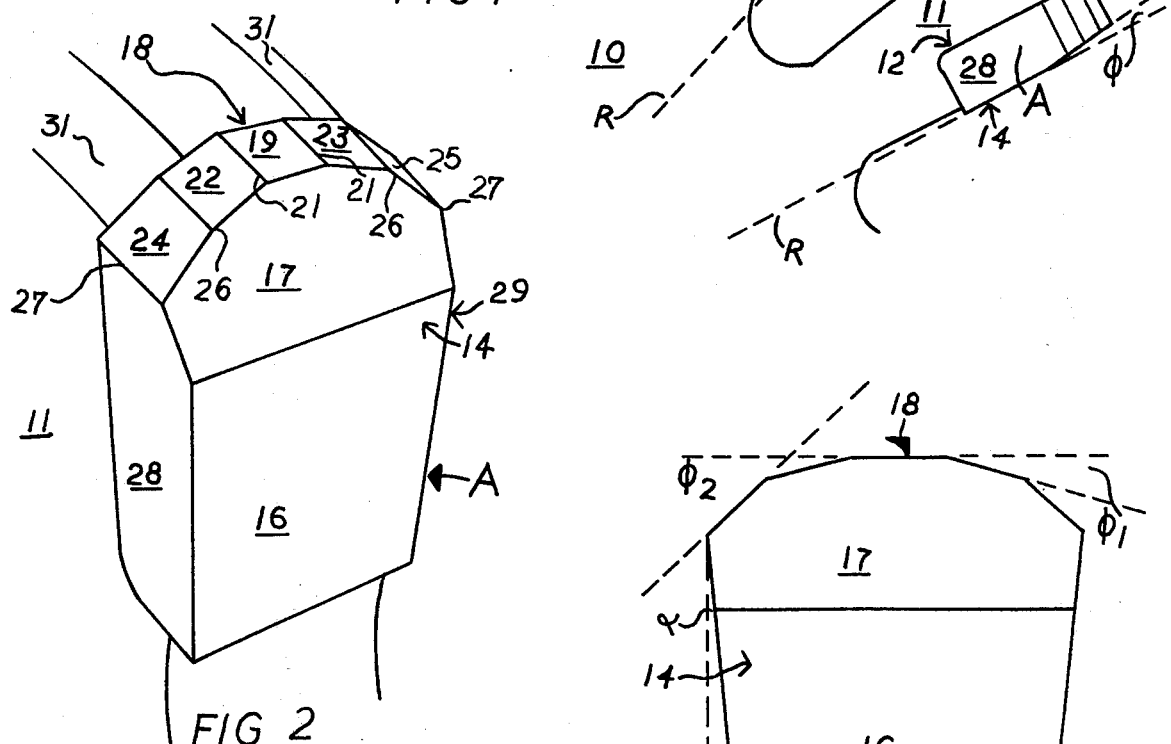
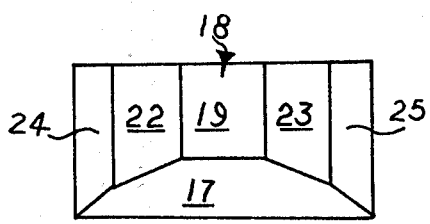
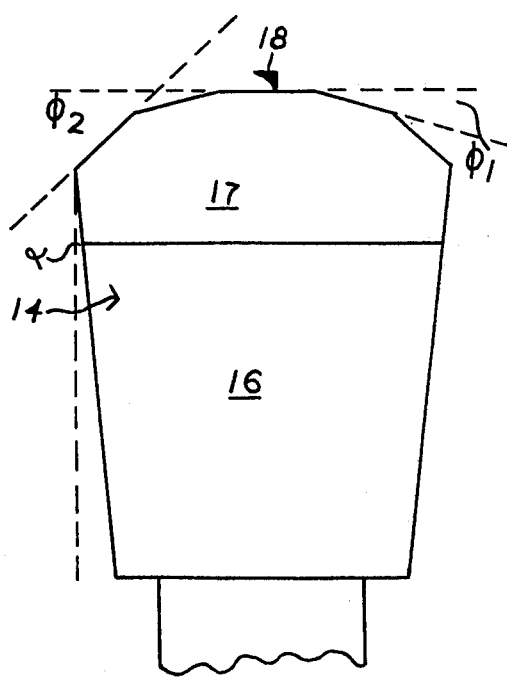
FIG 1
FIG 2
FIG 3
FIG 4

CUTTING TEETH FOR CIRCULAR SAW BLADES

FIELD OF THE INVENTION

The present invention relates to teeth for use in circular saw blades and, in particular, to raker and low teeth inserts which are alternatively positioned about the periphery of a circular saw blade.

BACKGROUND OF THE INVENTION

The use of inserts made of carbide are generally well known in the art. Various geometries have been proposed for such inserts which, for the most part, were to overcome problems associated with wear or deterioration. Various spherical or cylindrical geometries have been proposed such as U.S. Pat. Nos. 2,675,603, 3,537,491, 3,788,182 and 4,012,820. Other improved metal cutting geometries have been proposed in U.S. Pat. Nos. 3,576,061 and 3,576,200. Most importantly, the geometries proposed in U.S. Pat. Nos. 3,576,061 and 3,576,200 were shown to have increased the life of the blade as well as improved its metal cutting capability.

Generally, the geometry of U.S. Pat. No. 3,576,061 comprises a high tooth which has an outer central cutting edge at the top surface which intersects a negatively raked front face which is used to first remove a chip from the center of the kerf. Each high tooth is followed by a low tooth having a front face with a negative rake and two plane shearing faces that angle backwardly and flare laterally and outwardly from either side of the front face to remove two chips, one from each side of the kerf flanking the center chip. U.S. Pat. No. 3,576,200 provides a geometry for removing five chips from the kerf rather than three. The geometry taught therein comprises a high tooth having a central outer edge and two lateral cutting edges to remove three chips followed by a low tooth which includes two lateral cutting edges that are positioned between the outer and lateral cutting edges of the high tooth to provide two chips. The geometries taught in U.S. Pat. Nos. 3,576,061 and 3,576,200 provide circular saw blades which exhibit better metal cutting properties and longer life.

A suggested improvement over the triple-chip cutting teeth is set forth in U.S. Pat. No. 4,012,820 in which the working surface of the high and low teeth is arcuate rather than planar, but includes beveled top sides similar to U.S. Pat. No. 3,576,061. The principal advantage of the proposed design resides in the relative ease of grinding the arcuate working surface compared to three planar surfaces of the prior art.

Although it has been found that generally arcuate surfaces can be prepared with greater ease than a number of offset planar surfaces, planar working surfaces have been found to have better metal cutting characteristics and longer life than arcuate working surfaces. Accordingly, it is an object of the present invention to provide cutting teeth having planar working surfaces which have better metal cutting characteristics than the teeth disclosed in U.S. Pat. Nos. 3,576,061 and 3,576,200.

SUMMARY OF THE INVENTION

The present invention provides a raker tooth and low tooth, each of which preferably are manufactured from a carbide material, such as tungsten carbide, as an insert for use in circular saw blades. As in conventional saw blades, the raker and low teeth are alternatively positioned about the periphery of the blade typically by brazing them into corresponding pockets within the teeth of the saw blade. The teeth of the present invention are improvements over those taught and disclosed in U.S. Pat. Nos. 3,576,061 and 4,012,820.

Generally, the raker teeth of the present invention comprise a leading face and top portion. The leading face includes a first planar surface and a second planar surface which extends from the first planar surface to the top portion at a negative angle of inclination. The top portion of the raker teeth consists of five facets which are angularly offset from each other to define cutting edges therebetween.

The low teeth, on the other hand, provide a leading face which includes a first planar surface portion and a second portion which consists of five facets all of which are inclined at a negative angle from the plane of the first surface. Each of the five facets of the second portion are angularly offset from each other to define cutting edges which extend from the first planar surface to the top of the tooth. The top portion of the low tooth preferably lies in a plane which intersects the plane of the first planar surface at an angle slightly less than normal.

Compared with the conventional "triple-cut" teeth, a blade having the raker and low teeth of the present invention was found to have substantially improved performance, particularly in the area of wear. Other advantages of the present invention will become apparent from a perusal of the following detailed description of the presently preferred embodiment of the invention taken together with the accompanying drawings.

BRIEF DESCRIPTION OF THE DRAWINGS

FIG. 1 is a partial side view of a saw blade showing raker and low teeth alternatingly positioned about the periphery of the blade;

FIG. 2 is a perspective view of the raker tooth of the present invention;

FIG. 3 is a front elevation of the raker tooth;

FIG. 4 is a top view of the raker tooth;

PRESENTLY PREFERRED EMBODIMENT

Figure 5:
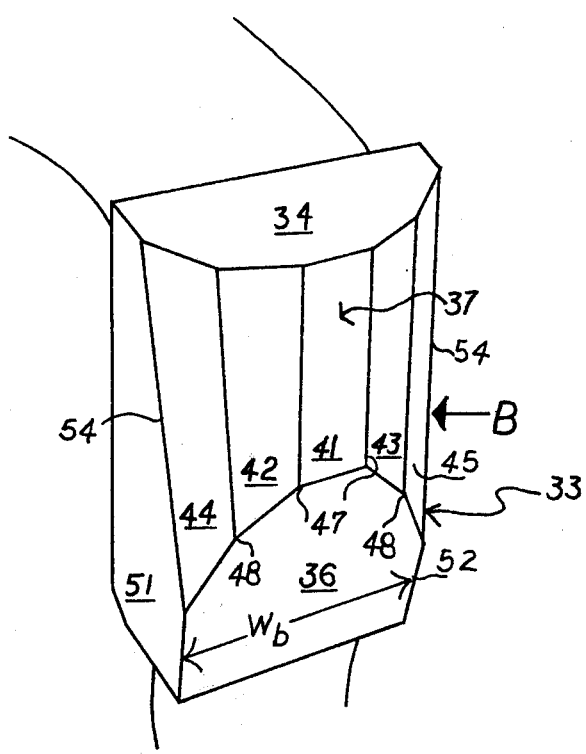
FIG. 5 is a perspective view of the low tooth of the present invention.
Figure 6:
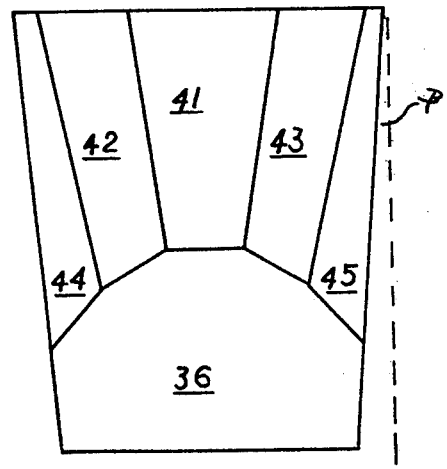
FIG. 6 is a front elevation of the low tooth.
Figure 7:
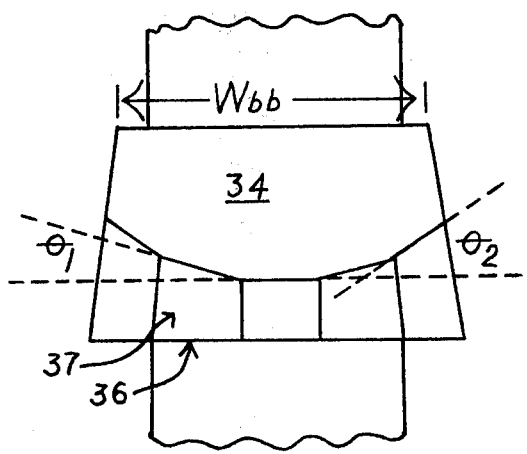
FIG. 7 is a top view of the low tooth.

Referring to FIG. 1, the outer peripheral portion of a conventional saw blade 10 is shown with teeth 11 uniformly distributed around the blade disc. Each tooth 11 includes a pocket 12 into which a cutting tooth insert is adapted to be positioned. As shown, raker tooth A and low tooth B of the present invention are alternatingly positioned on teeth 11. Preferably, raker teeth A and low teeth B are made from conventional carbide material, such as tungsten carbide, typically used in the manufacture of carbide cutting teeth.

With reference to FIGS. 2–4, raker tooth A comprises a leading surface 14 which includes a first planar surface 16 and a second planar surface 17 which extends from the first planar surface to the top portion 18. First planar surface 16 is adapted to lie in a plane which is parallel to a radial plane R (FIG. 1) of the blade. The second planar surface 17 is inclined at a negative angle $\phi$ to the radial plane R of the blade. [Negative angle means throughout an inclination away from the direction of rotation of the saw blade or the leading edge of the tooth]. Preferably, negative angle $\phi$ is about 15°.

However, variations of within about ± 10° of the preferred angle φ can be used advantageously with certain types of metals. However, it has been found that the preferred angle φ of 15° provides the best performance for a broad range of materials.

Top 18 of each raker tooth consists of a first center facet 19 which lies in a plane substantially normal to the plane of the first planar surface 16. Positioned on either side of first facet 19 are second facet 22 and third facet 23, respectively, each of which lies in a plane angularly offset from the plane of the first facet by a first angle $\phi_1$ which defines first edges 21 therebetween. First angle $\phi_1$ is between about 10° and 20° and preferably about 15°. Positioned adjacent to each second facet 22 and third facet 23 are fourth facet 24 and fifth facet 25, respectively. Each of the fourth and fifth facets lies in a plane which is angularly offset from the plane of first facet 19 by a second angle $\phi_2$ which defines second edges 26. Second angle $\phi_2$ is between about 30° and 45° and preferably about 40°. The fourth facet 24 and fifth facet 25 each join the respective sides 28 and 29 to form third edges 27.

Sides 28 and 29 of raker tooth A have radial clearance angle α of between 1° and 3° and preferably 2° to prevent the saw blade from binding in the material it is cutting. In utilizing raker tooth A with a conventional saw blade 10, it is preferable to bevel trailing edges 31 of tooth 11 as shown in FIGS. 1 and 2. Bevels 31 permit the facets of top portion 18 to extend slightly above the surface of teeth 11 to protect teeth 11 from wear or deterioration during cutting.

The low teeth B of the present invention comprise a leading face 33 and top portion 34. The leading face 33 includes a first planar surface 36 and a second portion 37. First planar surface 36 is preferably adapted to lie in radial plane R of blade 10. Second portion 37, however, is inclined at a negative angle from first planar surface 36 to top portion 34.

Second portion 37 consists of a first center facet 41 inclined at negative angle φ, where φ is between about 5° and 25° and preferably about 15°. Positioned adjacent to center facet 41 is second facet 42 and third facet 43. Second facet 42 and third facet 43 each lie in a plane which is angularly offset from the plane of first facet 41 by first angle $\phi_1$ which defines edges 47 therebetween. First angle $\phi_1$ is between about 5° and 25° and preferably about 15°. Positioned adjacent to second facet 42 is fourth facet 44 and positioned adjacent to third facet 43 is fifth facet 45. Each of the fourth and fifth facets 44 and 45 lie in a plane which is angularly offset from the plane of first facet 41 by a second angle $\phi_2$ which defines second edges 48. Second angle $\phi_2$ is between about 15° and 45° and preferably about 30°. The fourth and fifth facets 44 and 45 adjoin side 51 and 52, respectively to define third edges 54. Preferably, the width $W_b$ of first planar surface 36 is slightly greater than the width $W_{bb}$ of the back of insert B and the same as the width of raker tooth A beween edges 27. As with raker tooth A, the sides of low tooth B have a radial clearance angle β which is between 1° and 3° and preferably 2°.

As an example of the improved performance obtainable with the present invention, a 32" diameter saw having 60 teeth, comprising 30 raker teeth A and 30 low teeth B was used to cut steel bars. The bars were 6" round T-1 high carbon steel (28.5 in.$^2$/cut). The blade was operated at 56 RPM (dry cut with air jets) with a 10" travel/min. and was checked every ten cuts. The initial cutting time was 40 seconds which increased to 45 seconds. The blade cut 11,538 in.$^2$ of steel compared to 6,280 in.$^2$ with typical triple-cut geometries.

It is believed that the improved performance is obtained because the inserts of the present invention remove five small chips. Because these chips are smaller, they are now more easily removed and do not get stuck between the tip of the insert and material being cut. Accordingly, the wear is more uniform.

Additionally, it has been found that with the inserts of the present invention there appears to be better distribution of pressure between the insert and the material as shown by lower power requirements as compared to prior art inserts.

The blade ran cool to the touch and wore uniformly. At the end of the test, only sharpening was required. Accordingly, a substantial improvement was achieved using the teeth of the present invention.

While a presently preferred embodiment of the invention has been shown and described with particularity, it may be otherwise within the scope of the appended claims.

We claim:

1. A low cutting tooth for use in combination with a raker tooth in circular saw blades comprising a leading face and a top, said leading face including a first planar surface and a second portion consisting of a first center facet inclined at a negative angle from the first planar surface to the top, second and third facet, each positioned adjacent to the first facet and lying in a plane angularly offset from the plane of first facet by a first angle to define first cutting edges, and fourth and fifth facets positioned adjacent said second and third facets respectively, each lying in a plane angularly offset from the plane of the first facet by second angle to define second cutting edges, said fourth and fifth facets defining third cutting edges with the associated side of the tooth, and each of said sides has a radial clearance angle β.

2. A low tooth as set forth in claim 1 wherein said negative angle is between about 5° and 25°, said first angle is between about 5° and 25°, said second angle is between about 15° and 45°, and β is between 1° and 3°.

3. A low tooth as set forth in claim 2 wherein said negative angle is 15°, said first angle is 15°, said second angle is 30°, and β is 2°.

4. A low tooth as set forth in claim 2 wherein said raker tooth for use in combination therewith comprises a leading face and a top, said leading face including a first planar surface and second planar surface extending from said first planar surface to said top and lying in plane inclined at a negative angle from the plane of the first planar surface; and said top consisting of a first center facet lying in a plane substantially normal to the plane of first planar surface; second and third facets, each positioned adjacent said first facet and lying in a plane angularly offset from the plane of the first facet by a first angle to define first cutting edges; fourth and fifth facets, said fourth facet being positioned adjacent said second facet and said fifth facet being positioned adjacent said third facet, each of said fourth and fifth facets lying in a plane angularly offset from the plane of the first facet by a second angle to define second cutting edges, said fourth and fifth facets defining third cutting edges with the associated side of said tooth, and each of said sides has a radial clearance angle α.

* * * * *

UNITED STATES PATENT AND TRADEMARK OFFICE
CERTIFICATE OF CORRECTION

PATENT NO. : 4,133,240
DATED : January 9, 1979
INVENTOR(S) : Vollmer, Erwin H. and Vollmer, George J.

It is certified that error appears in the above—identified patent and that said Letters Patent is hereby corrected as shown below:

Column 3, line 40, "inclined at negative angle $\phi$, where $\phi$ is between about" should read -- inclined at negative angle $\theta$, where $\theta$ is between about --;

Column 3, line 45, and 46, after "angle" each occurrence delete "$\phi$" and substitute therefor -- $\theta_1$ --;

Column 3, line 51, after "angle" delete "$\phi_2$" and substitute therefor -- $\theta_2$ --.

Column 3, line 52, after "angle" delete "$\phi_2$" and substitute therefor -- $\theta_2$ --.

Signed and Sealed this

Fifteenth Day of April 1980

[SEAL]

Attest:

SIDNEY A. DIAMOND

Attesting Officer　　Commissioner of Patents and Trademarks